(12) United States Patent  
Pappalardo et al.

(10) Patent No.: US 7,831,804 B2
(45) Date of Patent: Nov. 9, 2010

(54) MULTIDIMENSIONAL PROCESSOR ARCHITECTURE

(75) Inventors: Francesco Pappalardo, Paterno (IT); Giuseppe Notarangelo, Gravina Di Catania (IT); Elio Guidetti, Manno (CH)

(73) Assignee: ST Microelectronics S.R.L., Agrate Brianza (MI) (IT)

( * ) Notice: Subject to any disclaimer, the term of this patent is extended or adjusted under 35 U.S.C. 154(b) by 221 days.

(21) Appl. No.: 12/130,861

(22) Filed: May 30, 2008

(65) Prior Publication Data

US 2008/0294871 A1      Nov. 27, 2008

Related U.S. Application Data

(63) Continuation-in-part of application No. 11/145,780, filed on Jun. 6, 2005, now abandoned.

(30) Foreign Application Priority Data

Jun. 22, 2004    (IT) .......................... TO2004A0415

(51) Int. Cl.
*G06F 15/80*    (2006.01)
(52) U.S. Cl. ............................... 712/20; 712/3; 712/10; 712/22; 712/24
(58) Field of Classification Search ........................ None
See application file for complete search history.

(56) References Cited

U.S. PATENT DOCUMENTS

| 5,203,005 | A | * | 4/1993 | Horst ........................... 712/15 |
| 5,287,472 | A | | 2/1994 | Horst |
| 5,471,593 | A | * | 11/1995 | Branigin ..................... 712/235 |
| 5,822,606 | A | * | 10/1998 | Morton ......................... 712/16 |
| 5,956,518 | A | * | 9/1999 | DeHon et al. ................. 712/15 |
| 6,052,773 | A | * | 4/2000 | DeHon et al. ................. 712/43 |
| 6,622,233 | B1 | * | 9/2003 | Gilson ......................... 712/11 |
| 6,697,979 | B1 | * | 2/2004 | Vorbach et al. ............. 714/724 |
| 2004/0006584 | A1 | * | 1/2004 | Vandeweerd ................ 709/107 |
| 2008/0016319 | A1 | | 1/2008 | Pappalardo et al. |

OTHER PUBLICATIONS

Chen et al., Multimedia Signal Processors: An Architectural Platform with Algorithm Compliation, Journal of VLSI Signal Processing 20, pp. 181-204, 1998.*

Chen et al., A Systolic Design Methodology with Application to Full-Search Block-Matching Architectures, Journal of VLSI Signal Processing 19, pp. 51-77, 1998.*

(Continued)

*Primary Examiner*—Cheng-Yuan Tseng
(74) *Attorney, Agent, or Firm*—Hogan Lovells US LLP (57) ABSTRACT

A processor architecture includes a number of processing elements for treating input signals. The architecture is organized according to a matrix including rows and columns, the columns of which each include at least one microprocessor block having a computational part and a set of associated processing elements that are able to receive the same input signals. The number of associated processing elements is selectively variable in the direction of the column so as to exploit the parallelism of said signals. Additionally the processor architecture of the present invention enable dynamic switching between instruction parallelism and data parallel processing typical of vectorial functionality. The architecture can be scaled in various dimensions in an optimal configuration for the algorithm to be executed.

11 Claims, 8 Drawing Sheets

OTHER PUBLICATIONS

AMD PowerNow! Technology 2002.*
Manning "An Approach to Highly Integrated, Computer-Maintained Cellular Arrays"; IEEE Transactions on Computers; Jun. 1977; pp. 536-552; vol. C-26, No, 6.
Chen, et al. "A Systolic Design Methodology with Application to Full-Search Block-Matching Architectures": Journal of VLSI Signal Processing; 1998; pp. 51-77; vol, 19; Kluwer Academic Publishers; Netherlands.
Chen, et al. "Multimedia Signal Processors: An Architectural Platform with Algorithmic Compilation"; Journal of VLSI Signal Processing; 1998; pp. 181-204; vol. 20; Kluwer Academic Publishers; Netherlands.
Featuring . . . AMD PowerNow!™ Technology; Advanced Micro Devices, Inc.; 2002.
Baxter, et al. "Building blocks for a New Generation of Application-Specific Computing Systems"; International Conference on Application Specific Array Processors; IEEE; 1990; pp. 190-201.
Kung "VLSI Array Processors"; IEEE ASSP Magazine; IEEE; Jul. 1985; pp. 4-22.
Yamauchi, et al. "Architecture and Implementation of a Highly Parallel Single-Chip Video DSP"; IEEE Transactions on Circuits and Systems for Video Technology; IEEE; Jun. 1992; pp. 207-220; vol. 2, No. 2.
U.S. Appl. No. 11/145,780; Office Action; Mailing Date May 22, 2007.
U.S. Appl. No. 11/145,780; Amendment and Response to First Office Action; filing Date Aug. 9, 2007.
U.S. Appl. No. 11/145,780; Final Office Action; Mailing Date Oct. 2, 2007.
U.S. Appl. No. 11/145,780; Amendment and Response to Final Office Action Accompanying Request for Continued Examination (RCE); filing Date Dec. 6, 2007.
U.S. Appl. No. 11/145,780; Final Office Action; Mailing Date Jan. 24, 2008.

* cited by examiner

MULTIDIMENSIONAL PROCESSOR ARCHITECTURE

RELATED APPLICATION

The present invention is a continuation-in-part of U.S. patent application Ser. No. 11/145,780 filed Jun. 6, 2005 which claims priority from Italian Patent Application No. TO2004A000415 filed Jun. 22, 2004, both of which applications are hereby incorporated by reference in their entireties for all purposes as if fully set forth herein.

FIELD OF THE INVENTION

The present invention relates to processor architectures and has been developed with particular attention paid to applications of a multimedia type.

DESCRIPTION OF THE RELATED ART

The prior art regarding processor architectures is extremely vast and extensive. In particular, for applications directed at fast treatment of images, processors are known, such as the Intel® MXP5800/MXP5400 processors, which call for an external processor with a PCI (Peripheral Component Interconnect) bus for downloading the microcode, implementing the configuration and initialization of the registers, and handling the interrupts.

The basic computational block of MXP5800/MXP5400 processors is somewhat complex and comprises five programming elements, each of which is provided with its own registers and its own instruction memory. This results in a considerable occupation of area and in a significant power absorption. In particular, there is not envisaged a function of power management that is able, for example, to deactivate the programming elements currently inactive.

Of course, what has been said with reference to the Intel® product considered previously applies to numerous other processor architectures known in the art.

What is desired, therefore, is to overcome the intrinsic limitations of the known art referred to previously by supplying a processor architecture that is able to provide, in an optimal way, a device with low power absorption particularly suitable for application in a multimedia context including mobile communications, treatment of images, audio and video streams, and the like.

SUMMARY OF THE PRESENT INVENTION

An embodiment of the present invention achieves the purposes outlined previously starting from a basic architecture that is customized on the basis of the algorithms to be executed.

According to an embodiment of the present invention, a multidimensional architecture includes a matrix architecture that combines the paradigms of vector processing, Very Long Instruction Word (WLIW) and Single Instruction Multiple Data (SIMD) with a considerable recourse to resources of a parallel type both at a data level and at an instruction level. Recourse is had to the data-flow logic, which is simple, and to the high throughput of a "systolic" machine architecture.

A systolic architecture represents the alternative approach with respect to a structure of a pipeline type, and is simpler than the latter. The pipeline is in fact a structure with synchronous one-dimensional stages, where the stages are "stacked" and each stage consists of a single processing unit, i.e., processing of the data that each instruction must perform is divided into simpler tasks (the stages) each of which requires only a fraction of the time necessary to complete the entire instruction.

A systolic architecture is, instead, a structure with complex stages, where the processing elements process in a synchronous way exchanging the data in an asynchronous way through communication buffers.

In this way, the data flow from one processing element to the next, and are progressively processed. In theory, then, the data can move in a unidirectional path from the first stage to the last.

In particular, in direct contrast to the Intel MXP5800/MXP5400 product referred to previously, the solution described herein envisages entrusting the various tasks of downloading of the microcode, configuration and initialization of the registers, description of the interrupts not to an external element, but rather to a computational unit for each column of the matrix of the multidimensional architecture.

An embodiment of the present invention is based upon the criterion of defining, as starting points, the algorithm that is to be mapped in the architecture and the performance (i.e., the throughput) to be achieved.

Starting from this, the relations between the various limitations in terms of area occupation, power absorption and clocking regarding the architecture analysed are considered. It is in fact evident that strategies of faster operation usually exploit the condition of parallelism, increasing the occupation in terms of area and rendering power losses more significant as compared to the total power absorption. On the other hand, slower architectures enable a reduction in the power absorption at the expense of the performance.

The scalable-multidimensional-matrix architectural solution (SIMD, vector, VLIW, systolic) described herein enables precise definition, according to the algorithm to be implemented, of the optimal architecture. In particular, the architecture can be defined by being scaled in the various dimensions (SIMD, vector, VLIW, systolic) in an optimal configuration for the algorithm to be executed: architectures having a vector-type dimension and/or SIMD type are privileged in the presence of algorithms with a high level of parallelism of the data; instead, architectures of a VLIW type prove optimal in the case of a high parallelism of the instructions.

The above is obtained, at the same time preserving a flexible processor architecture, which is readily customizable, with due account taken to the fact that, in the vast majority of cases, it is required to map a number of algorithms in the same architecture which will hence be scaled to adapt to the algorithm that is computationally more complex, while maintaining the computational capacities for the simpler algorithms.

The multidimensional-processor architecture described herein has characteristics of high scalability, with the possibility of increasing or reducing the arithmetic units without an incremental control logic, with the added possibility of changing the bit size of the arithmetic unit.

In terms of modularity, there exists the possibility of characterizing in a different way the processing elements in the different columns of the matrix while, in terms of flexibility, the architecture can be adapted dynamically to the algorithm mapped by simply switching a larger or a smaller number of columns or rows of the matrix.

As regards the extendibility of the instructions, the architecture described herein can execute both instructions of a SIMD/vector type and instructions of a MIMD type, with the added possibility of achieving optimal solutions in terms of hardware/software sharing.

The architecture is readily customizable according to the most complex algorithm to be mapped.

An embodiment of the present invention can be implemented on the basis of already existing microprocessor architectures with a small number of modifications.

In sum, the architecture of the present invention is developed generically in a multidimensional way, along the lines of different computational characteristics (SIMD, vector, VLIW, systolic), in an environment that enables simulation of the architecture on the basis of the different configuration of the computational directions. Subsequently, on the basis of the algorithm that is to be executed and of the different simulations that will be made on the various cuts of the architecture, the optimal architecture is defined and hence the best configuration in terms of computational speed, area occupation, power absorption, etc., and the architecture is consequently arrived at by simply scaling the basic architecture according to the optimal configuration obtained.

In this way, a development environment of the optimal architecture for complex algorithms is also envisaged, made up of programmable computational devices or blocks.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
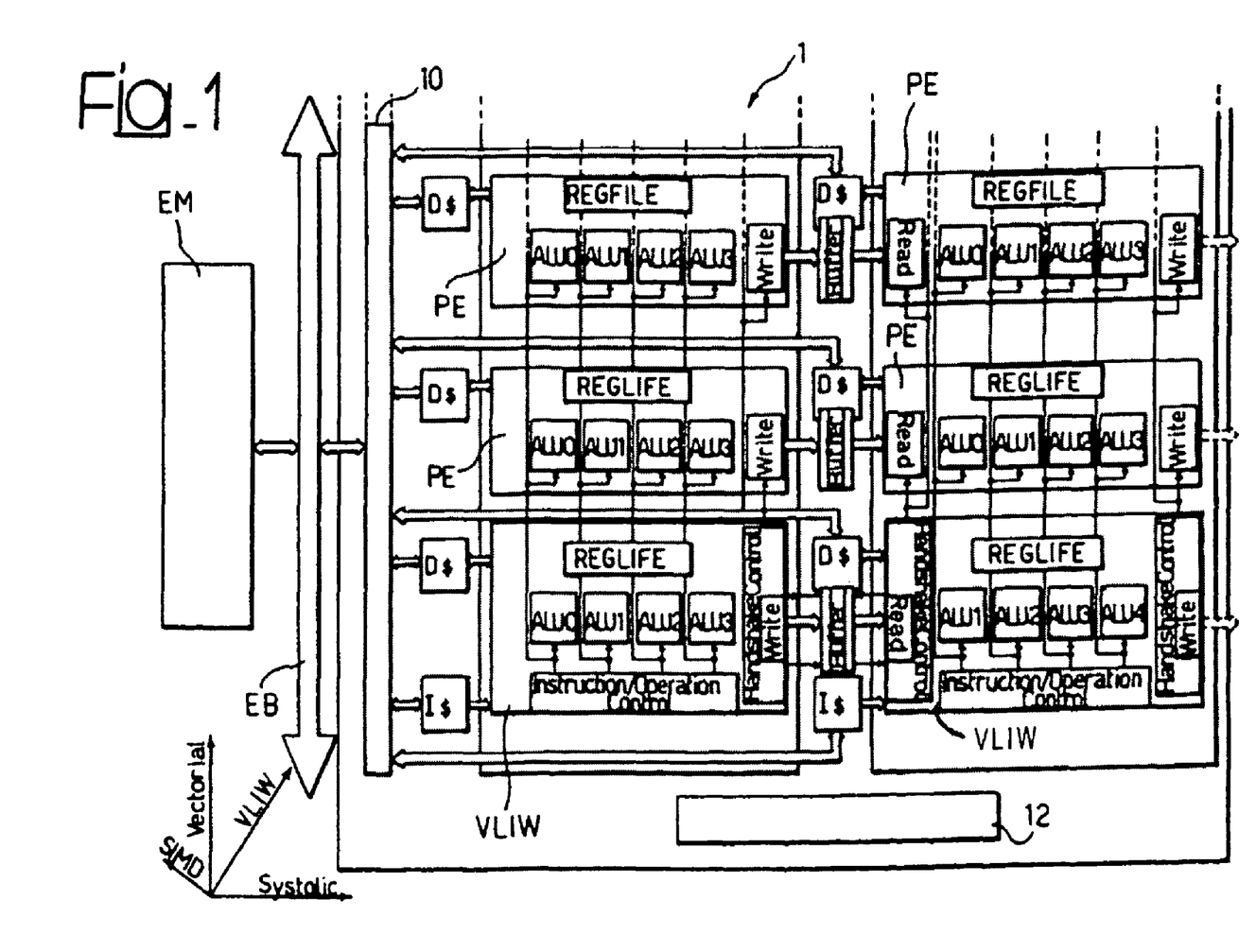
FIGS. 1-8, illustrate possible configurations of a processor architecture according to embodiments of the present invention; and wherein FIGS. 4 through 8 relate to an embodiment of the present invention that jointly provides high performance and low power absorption in a device suitable for multimedia applications (wireless, image processing, video stream, etc.).
Figure 2:
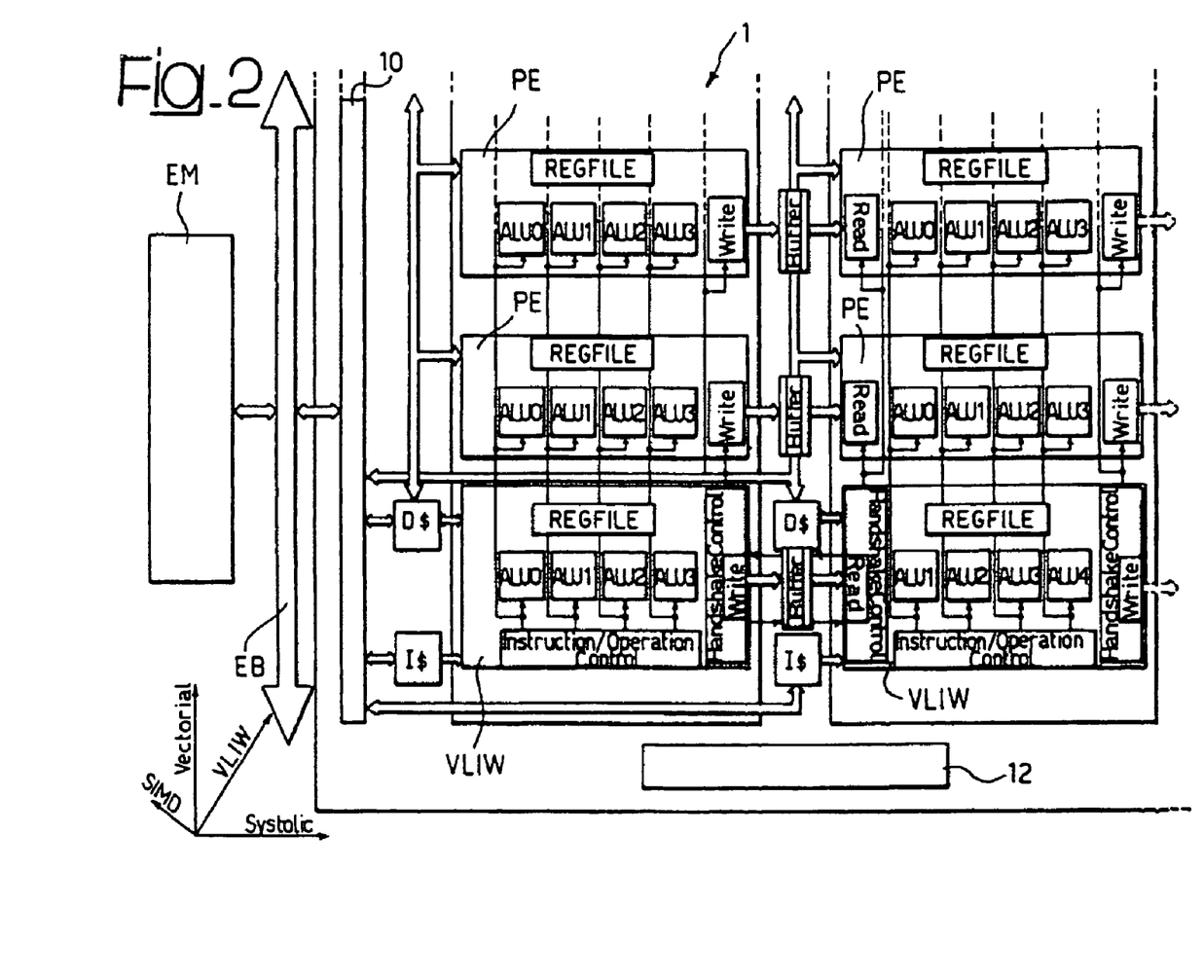
Figure 3:
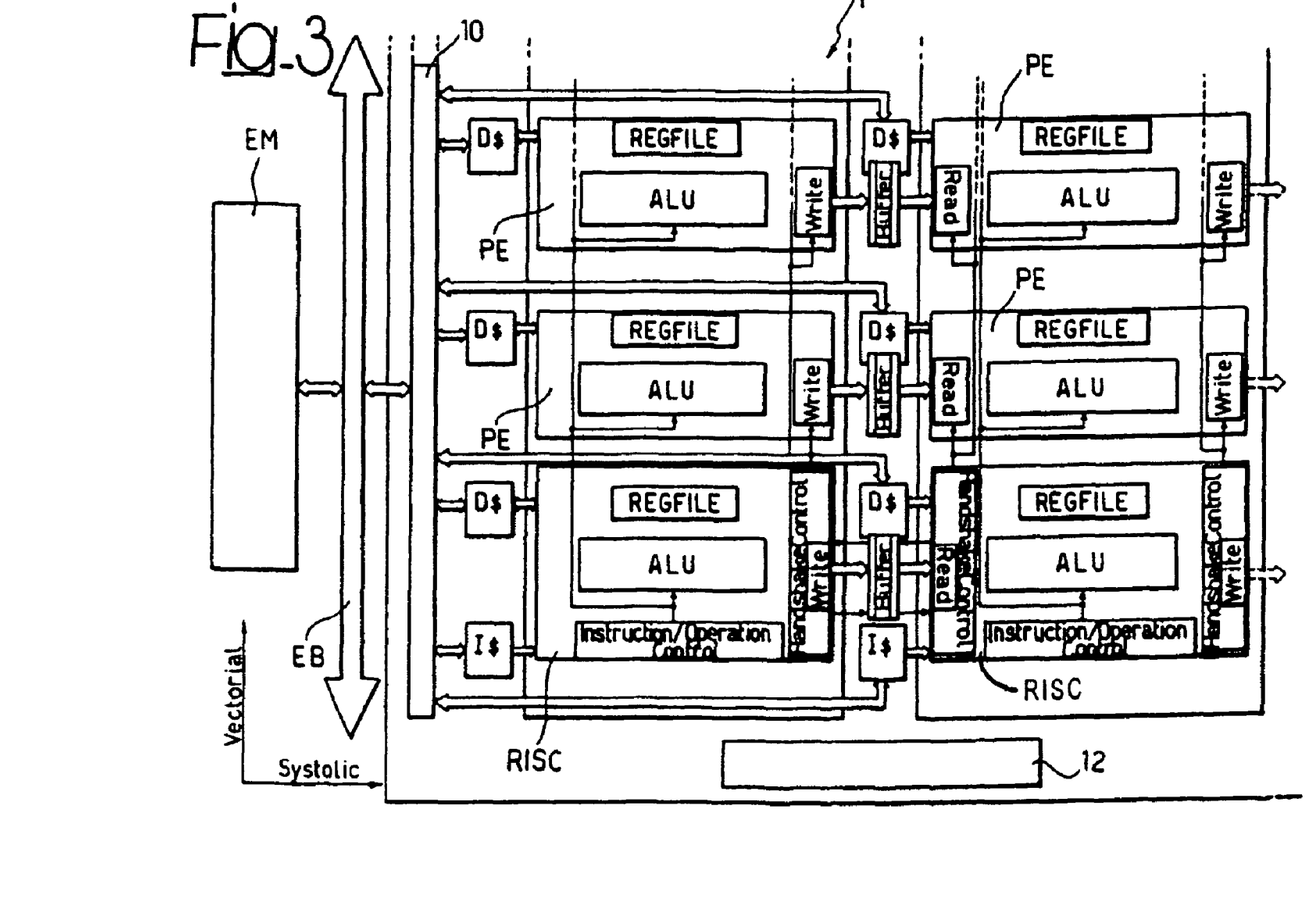

FIGS. 1, 2 and 3 refer to a processor architecture designated as a whole by 1. The architecture 1 is designed to dialogue with an external memory EM via a external bus EB.

For said purpose, the architecture includes a core-memory controller block 10 that interfaces with the various elements of the architecture 1 presenting a general matrix structure which is described in greater detail below.

The reference number 12 designates a unit for managing the power (power-management unit or PMU) consumed by the individual blocks configured so as to be able to set selectively in a condition of quiescence, with reduced power absorption (virtually zero), one or more elements of the structure that are not currently being used.

The reference PE designates in all three figures a processing element configured (in a way in itself known) so as to comprise a register file (Regfile) and a plurality of arithmetic-logic units (ALU1, ALU2 . . . ) preferably configured according to the SIMD (Single Instruction Multiple Data) paradigm.

The processing elements PE are then provided with write and/or read registers for communication between the systolic elements.

In this architecture, the data-cache blocks D$ are distributed between the various processing elements PE.

The solution illustrated in FIG. 2 differs from the solution of FIG. 1 as regards recourse to a shared cache.

FIG. 3 illustrates instead a possible application of a RISC (Reduced Instruction Set Computer) control type.

In the diagram of FIG. 1 there are then present, in addition to the processing elements PE of the type described above, also elements or modules of the VLIW (Very Long Instruction Word) type that can include SIMD instructions, for all the computational elements of the column to which they belong. The VLIW modules basically comprise the same constituent elements already described previously, with moreover respective elements for instruction/operation control and instruction-cache modules I$, as well as handshake control modules for driving the functions of data communication between the adjacent systolic elements.

The configuration of FIG. 2 is similar to the configuration of FIG. 1 with the difference represented by the fact that the data cache is shared by all the processing elements PE.

The configuration of FIG. 3 can be viewed as a sort of reduced configuration deriving from the combination of the configuration of FIG. 1 and the configuration of FIG. 2.

As in the case of the configuration of FIG. 1, modules D$ are present associated to the processing elements PE (which, in the case of FIG. 3, comprise a single arithmetic-logic unit ALU). Instead of the VLIW elements of FIGS. 1 and 2, in the diagram of FIG. 3 there are present elements of a RISC type comprising respective instruction/operation control modules, as well as handshake-control modules. Also in the case of the RISC elements of FIG. 3, an arithmetic-logic unit ALU is present for each element.

It will be appreciated that, in all the schemes illustrated, the rows of the matrix are systolic arrays in which each processing element executes a different algorithm on the input data.

Communication between the processing elements PE is performed in a synchronous way through a buffer with a simple handshake logic.

To be able to exploit the parallelism of the data, the horizontal structure can be replicated n times vertically with a vector approach (possibly according to the SIMD paradigm).

For each column, a VLIW processor manages the flow of instructions and control of operation. For each column, the calculating elements can be characterized by a different arithmetic unit (ALU or else ALU & MUL or else ALU & MAC, etc.) or dedicated hardware accelerators for improving performance.

The acronyms referred to previously are well known to persons skilled in the sector and hence do not need to be described in detail herein.

Basically, the algorithm that is mapped defines the dimensions of the data. To render the structure more flexible, each vector element is able to function on packed data, namely, ones organized on 8, 16, 32 or more bits (according to a typical SIMD-processing modality).

The power-management unit 12 is able to control power absorption by acting at different logic levels.

At the system levels, the unit 12 selectively deactivates ("down mode") the system resources that are not useful for current execution of the algorithm.

At the lower levels, the unit 12 manages frequency scaling so as to balance out the computational load on different processors. In practice, the unit 12 modifies the relative frequency of operation so as to render uniform the processing times of the algorithms on the various columns. It manages the mechanism of pipelining of the algorithms, if necessary slowing down the faster units.

The unit 12 can be configured so as to deactivate supply loops in order to prevent any power absorption due to losses during the steps of quiescence of the individual elements.

Advantageously, the power-management unit 12 is configured for performing a function of variation of the supply voltage proportional to the scaling of the frequency of operation of the various processing elements PE so as to reduce power consumption.

The multidimensional architecture described is readily customizable according to algorithms that do not require a high computational capacity.

This fact is exemplified, for instance, in FIG. 3. In this regard, it may be noted, for example, that the most elementary architecture is a VLIW processor, which in effect can prove oversized for individual algorithms.

In the case of algorithms of medium-to-low complexity, it is more appropriate to refer to a scheme of a RISC control type such as the one illustrated in FIG. 3 that is without SIMD instructions.

With the approach illustrated it is possible to cause all the processing elements PE in the same column to execute the same instruction.

This solution simplifies the control of the flow of the instructions and operations, since it does not exploit the parallelism of the instructions.

On the other hand, the parallelism of the data (in the vertical direction) and the possibility of executing algorithms of a pipeline type (in the horizontal direction) are preserved.

The "atomic" element of the architecture (in practice, a column) can be developed, starting from RISC structures with vector capacities of a known type.

In general, an architecture of a multidimensional type with VLIW control (such as the ones represented in FIGS. 1 and 2) are more suitable for algorithms of medium-to-high complexity. Instead, a structure with RISC control of a two-dimensional type, as represented in FIG. 3, represents an optimal solution for algorithms of medium-to-low complexity.

During development of the individual circuit, it is possible to resort either to a simulation environment or to an evaluation device with the possibility of exploiting either a VLIW-type controller or a RISC-type controller.

It is to be pointed out that the RISC is obtained from a VLIW, by setting at 1 the parallelism of the instructions to be executed.

The overall dimensions of the matrix of the architecture described herein can be of quite a high order (for example, be represented by a 6×6 matrix) even though, at least in the majority of the applications considered, a matrix of size 3×2 may prove more current.

In the design stage, it is possible in any case to start from an evaluation array of maximum dimensions so as to enable the developer to define the optimal dimensions of the device in order to obtain optimal results in terms of minimization of power absorption and occupation of area given the same final performance.

The solution described enables implementation of an optimal device with low power absorption for each application considered (mobile communications, processing of images, audio and video stream, etc.) starting from a basic architecture that is customized on the basis of the applicational requirements.

In this regard, it will be appreciated that in the present description the connotation of processing block PE refers only to the processing part, i.e., the ALU, MUL, MAC, Register File (RF) part, etc. in so far as it is the number of processing elements PE that can increase in the direction of the column to exploit the data parallelism.

Very simply, in the solution described herein, the processing elements PE function as "copy & paste" of the computational part of the basic microprocessor in so far as they are driven by the same signals.

Also appreciated will be the possibility of distinguishing the case where the unit 12 sets a number of processing elements PE in the quiescent state in order to reduce the power consumption if they are not being used from the case where, in the step of definition of the architecture, it is possible to vary the number of processing elements PE to be used according to the algorithm to be executed.

From this point of view, it is possible to recognize the scalability of the processing elements PE, i.e., of the vector-type configuration (data parallelism), the scalability of the instruction parallelism and hence of the depth of the VLIW, the scalability of the data size, i.e., of the SIMD and/or the bus width, and the scalability of the number of columns (systolic configuration), which can be implemented in the stage of definition of the architecture according to the algorithm to be treated.

In this way, it is possible to define the architecture in terms of vector direction, i.e., data parallelism (number of processing elements PE), VLIW direction, i.e., instruction parallelism, systolic direction, i.e., number of algorithms to be executed in series, and SIMD direction, i.e., data dimension.

FIGS. 4-8 relate to an embodiment of the present invention that jointly provides high performance and low power absorption in a device suitable for multimedia applications such as wireless, image processing, video stream, etc. This object is again achieved by extending the instruction parallelism of a Very Long Instruction Word (VLIW) architecture with the data parallel processing of the Vectorial functionality. This entails an increased flexibility to exploit, in runtime mode, the instruction or data parallelism, according to the application algorithms.

One advantage of the architecture of FIGS. 4-8 lies in the dramatic reduction of code size and consequently a high power reduction on fetching instruction and data. The embodiment of FIGS. 4-8 increases the area only marginally while providing significant improvement in performance. The microprocessor of FIGS. 4-8 includes a series of capabilities whereby all the elements of the core may ideally "fit" the functional mode selected. This embodiment provides an innovative microprocessor architecture that implements a high performance device, with easy power control and reduced code size, and is particularly suitable for multimedia applications such as wireless, image processing, video stream, etc. The embodiment of FIGS. 4-8 fully exploits instruction and/or data parallelism switching between them dynamically: this causes a dramatic decrease in code size (which translates into a significant reduction of power absorption related to fetching instructions and data), ensures efficient use of the computational units and at the same time, makes it possible to have a reconfigurable core wherein the number of processing elements may be scaled depending on the application. Smart runtime reconfigurability is achieved with a very small increase in terms of area requirements, which makes the core competitive with any major portable microprocessor for multimedia algorithms processing.

The embodiment of the present invention shown in FIGS. 4-8 includes various capabilities that make the core elements capable of "fitting" the functional modes selected.

Figure 4:
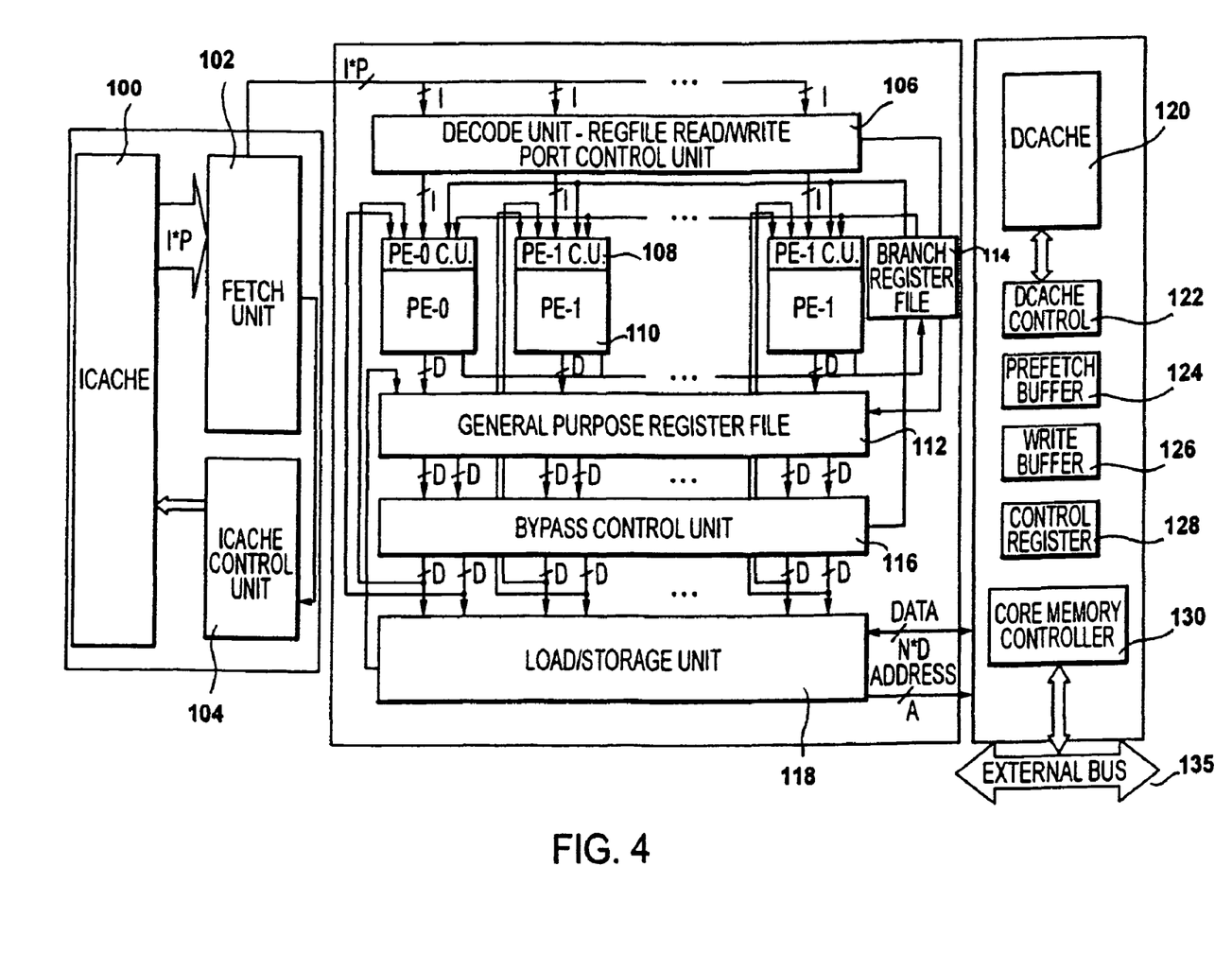

The block diagram of FIG. 4 shows an exemplary microprocessor architecture wherein the following notations are used:

I: number of bits of each instruction.
P: number of Processing Elements (ALU) and/or number of ILP (i.e. instructions packed in the same long instruction).
D: number of bits in each data item.

Figure 5:
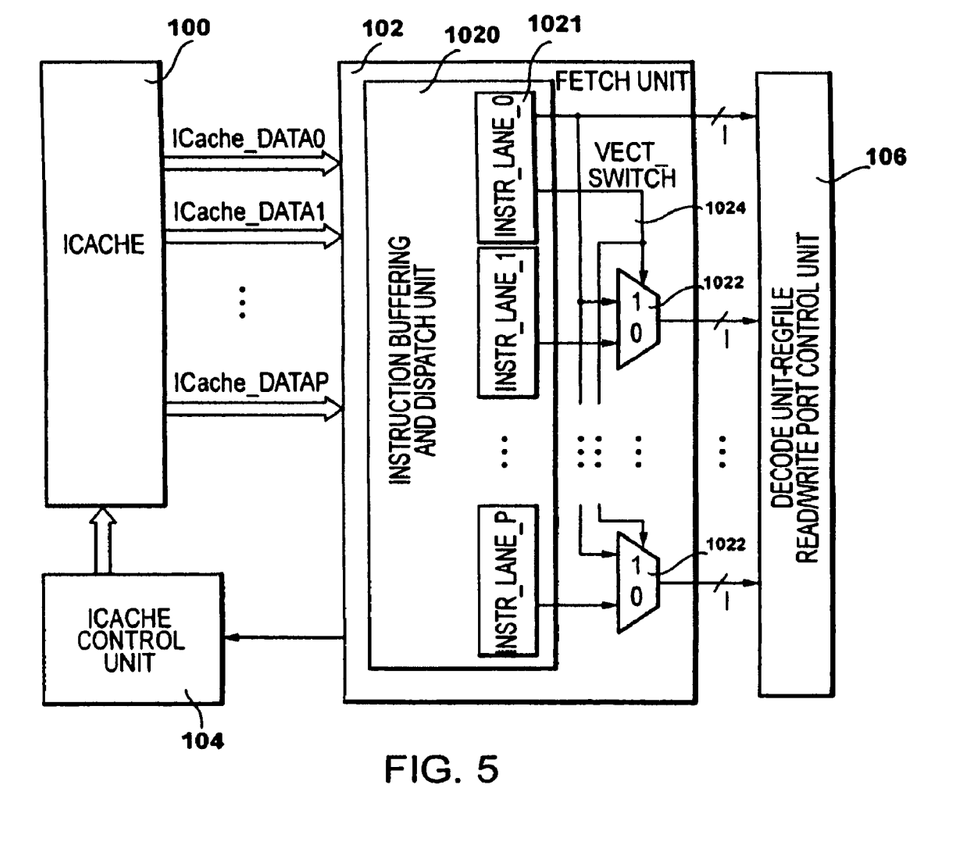

The exemplary architecture of FIGS. 4 and 5 includes an Instruction-Side Memory Subsystem which embodies a VLIW instruction parallelism capability, with:

a generic Instruction Cache 100;
a Fetch Unit 102 to fetch P instructions (notionally) at each clock cycle and issue them towards a Decode Unit; and
an Instruction Cache Control Unit 104 to manage the entire Instruction Side Memory Subsystem.

The exemplary microprocessor architecture of FIG. 4 also includes a Decode Unit—Register file Read/Write Port Control Unit 106. This module includes two important capabilities, namely:

a Decode Unit to recognize the P instruction fetched as issued by the Processing Element Control Units PE-0 C.U., PE-1 C.U., PE-2 C.U., ..., PE-P C.U. (collectively designated as 108) before passing them to the Processing Elements PE-0, PE-1, PE-2, ..., PE-P, (collectively designated as 110) to be processed;
a Register File Read/Nrite Port Control Unit 106: this may play a significant role in the load/storage of data into the Register File to support the runtime selection between Scalar and Vectorial data.

This feature will be better explained in the following.

The Processing Elements Control Units 108 manage the use of the corresponding Processing Elements 110, by issuing the right data onto the right computational elements of the associated Processing Element and selecting the right output data therefrom. The units 108 may exert a power control action by switching off those modules in the associated Processing Element that may not be needed for current processing.

The Processing Elements 110 may integrate any kind of computational resources useful for the application target: adders, multipliers, shifters, and so on, including full custom hardware dedicated units. Each Processing Element 110 may be separated from the others.

For simplicity, all the Processing Elements 110 may be assumed to include the same type of computational resources. This may be useful in supporting both scalar and Vectorial data processing on all Processing Elements 110 but is not a mandatory requirement: in fact the architecture may include only certain Processing Elements with exactly the same computational resources if the Vectorial operative mode switching is of interest only for this kind of Processing Elements.

The number of the Processing Elements 110 (and the number of Processing Elements Control Units 108 associated therewith) may increase or decrease without changing the basic control logic of the whole processor. This gives to the architecture a great level of scalability, flexibility and reconfigurability.

A General Purpose Register File 112 stores data in a number of registers for the Processing Elements 110. Data from the Processing Elements 110 to be stored General Purpose Register File 112 and data from the General Purpose Register File 112 to be loaded into the Processing Elements 110 may be selected from the registers under the control of a Register file Read/Write Port Control Unit 106. The number of write and read ports will depend on the number of Processing Elements 110 but will be independent from the different nature of data (scalar or Vectorial). A Branch Register File 114 co-operates with the Register file Read/Write Port Control Unit 106 and the General Purpose Register File 112.

A Bypass Control Unit 116 bypasses data to the Processing Elements 110, before the external memory storage, when they should be available into subsequent cycles.

A Load/Store Unit 118 manages data storage and fetching from the Data Side Memory Subsystem; this includes a generic Data Cache 120 with its own Data Cache Control Unit 122, a Prefetch Buffer 124, a Write Buffer 126, a series of Control Registers 128 and a Core Memory Controller 130 which manages communication with the external bus 135 and external modules (memory, peripherals etc.).

The Fetch Unit 102 will now be described in greater detail with additional reference to FIG. 5.

In a conventional VLIW-based microprocessor the fetch unit represents the module where, at each cycle, the instructions/operations are fetched from the Instruction Cache 100, packed into bundles and then dispatched to the instruction lanes. Each lane is then addressed to the Decode Unit.

At each cycle, up to P instructions are packed into a bundle and then dispatched. The packing in the bundle is driven by the stop-bundle bit that represents the effective last instruction of the current bundle. The stop-bundle is set by the compiler and computed according to the intrinsic nature of each instruction (computational resources needed, delay, latency), to the encoding restrictions (preservation of a particular lane) and according to the pipeline organization typical of a VLIW machine.

The compiler has the important role, when required, to schedule instructions on the right lane in order to address it where the right hardware support is present.

A feature of the embodiment of the present invention illustrated in FIGS. 4-8 lies in how the Fetch Unit 102 supports the capability of exploiting instruction and/or data parallelism switching between them dynamically.

From the software point of view, as the compiler schedules a Vectorial instruction, it sets the bundle stop bit to 1 in order to fill the bundle with this kind of instruction. Moreover the compiler can also be programmed to address the Vectorial instruction onto a dedicated lane (for example the first one). This capability of the compiler is not of specific relevance to this disclosure, as this is already present on current VLIW machines that need a static scheduling of the instructions to perform after the start point.

From the hardware point of view, the opcode itself brings the information to the core of a Vectorial instruction fetched. This information is issued by a single bit referred to herein a vect_switch bit. The vect_switch bit set to 1 selects a series of P multiplexers, placed just before output pins of the Fetch Unit, to replicate the Vectorial instruction/operation onto all the lanes available or the (up to) P scalar instructions packed into the bundle to the Decode Unit. This phase should be considered as a sort of fast pre-decode stage into the core organization. FIG. 5 is representative of this concept.

One may reasonably assume that the compiler will schedule the Vectorial instruction onto the first lane, although it will be appreciated that this is not mandatory because the logical circuit remains basically the same. Specifically, FIG. 5 shows an Instruction Buffering and Dispatch Unit 1020 (including a plurality of instruction lanes Instr_LANE_0 to Instr_LANE_P, collectively indicated as 1021) co-operating with a set of multiplexers 1022 as previous described. In this example, the lane Instr_LANE_0 is where the Vectorial instruction will be scheduled by the compiler: this is why no multiplexer proper is included in that lane.

Concerning operation of the multiplexers 1022 certain simple considerations apply. If the stop-bundle bit is useful to the lanes 1021 also after the fetch phase, this is not propagated onto the other lanes when the vect_switch bit of the Vectorial instruction enables the propagation of the instructions on all the lanes available. The reason for this is clear: the goal to make the bundle full of the same Vectorial instruction should be made useless if the stop-bundle bit should be present also into the other lanes because the core should recognize not a bundle of P instructions but P bundles of one instruction.

In order to be able to propagate the same Vectorial instruction onto all of the P lanes, all the Processing Elements 110 should have the same hardware resources to perform the Vectorial instruction set. For example to insert a Vectorial 32×32 Multiplication into the instruction set, one (and the same one) Multiplexer Unit will be provided for each Processing Element.

Figure 6:
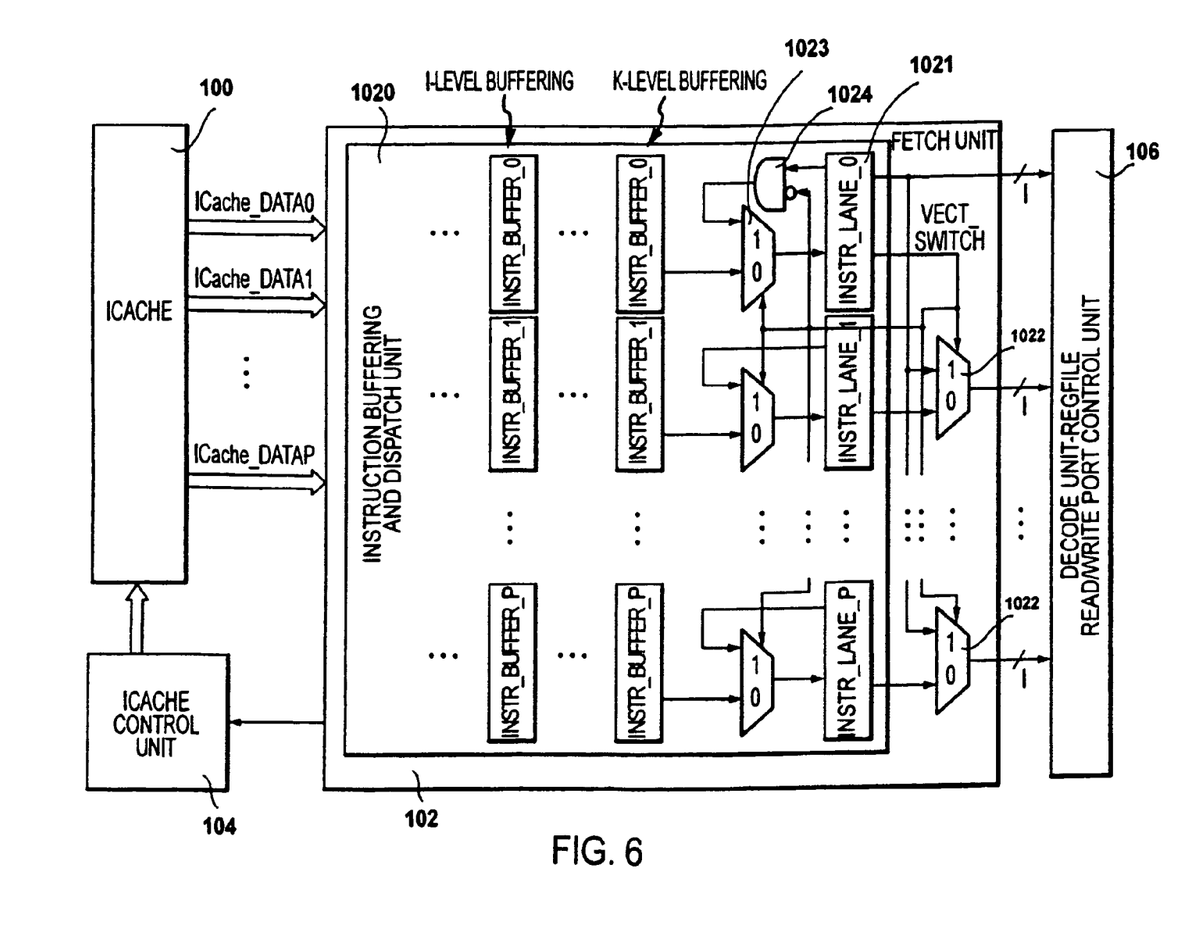

An interesting approach is to activate the mechanism only for those Processing Elements which include the corresponding hardware support, whereby the core is organized without limitations onto how many lanes (i.e. Processing Elements) are dedicated to the Vectorial switching capability. As shown in FIG. 6, the core implements the Instruction Buffering and Dispatch Unit 1020. The purpose of this module in the Fetch Unit block 102 is to buffer instructions fetched from the Instruction Cache 100 (notionally P at each cycle), in order to re-organize and dispatch them onto the right lanes according to the restriction already outlined before (stop-bundle, encoding restrictions etc.).

This mechanism may include various levels of buffering (two or more) in order to make available, as much as possible, instructions for the core operation (preserving stall phases too long) and in order to organize as well as possible the right dispatching.

The set of multiplexers 1022 selects the Vectorial instruction propagation or the scalar instruction packed into the current cycle bundle. When the selection is for the Vectorial instruction propagation, the current bundle of scalar instruction should be lost and, so, it has to be re-fetched from the Instruction Cache 100 and re-scheduled from the Dispatcher.

The embodiment illustrated includes a buffering mechanism to recycle the bundle of scalar instructions. This is enabled from the vect_switch 1024 and is essentially made by a series of multiplexers to recycle the current bundle or latched the subsequent one. This is a low-cost solution which does not modify appreciably the pre-existent structure of buffering and dispatching, whatever this may be.

FIG. 6 shows the bundle recycling solution just described, with multi-level buffering (i-level to k-level buffering) of instruction buffers Instr_buffer_0 to Instr_buffer_P, with recycling controlled by multiplexers 1023.

Recycling also the instruction onto the lane Instr_LANE_0 (assumed to be the lane where the compiler schedule the Vectorial instruction) in the same way as the other lanes may be a source of error because the Vectorial instruction should be recycled without having been requested. For that reason an AND port 1024 will schedule a NOP operation in the first lane Instr_LANE_0 when the recycling is requested.

Note how only the vect_switch bit drives all the design solutions proposed until now.

A Source/Destination Registers Re-computation Unit, may be activated.

Figure 7:
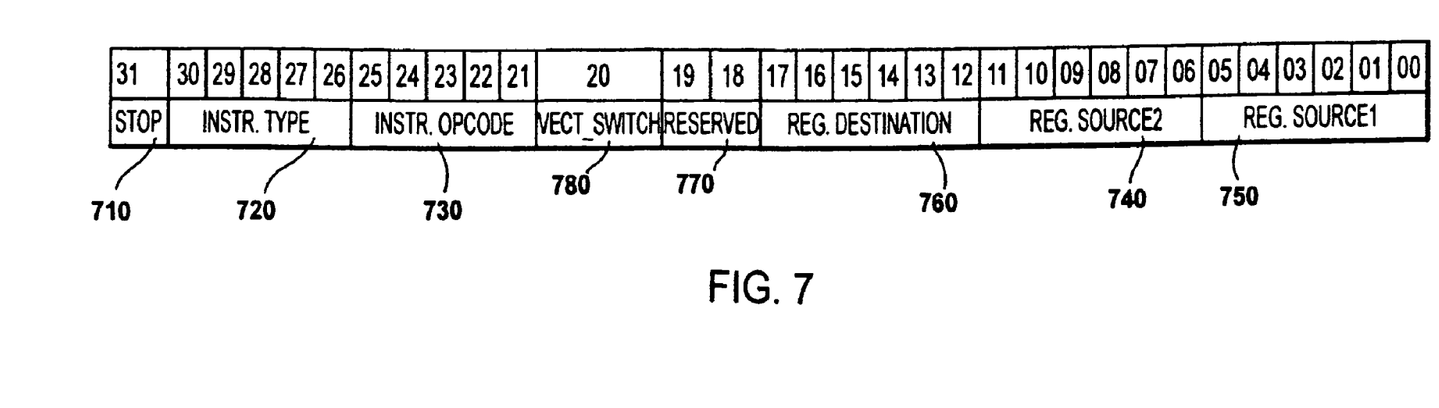

A typical register-register format opcode of a 32 bit VLIW microprocessor is exemplified in FIG. 7.

The encoding fields may be arranged as follows:

Stop-bundle field 710: the nature and role of this field has been discussed previously.

Instruction Type field 720: the bits in this field select the hardware resource needed, e.g. Integer Unit, Floating Point Unit, Load/Store Unit etc.

Instruction Opcode field 730: this filed carries the acknowledgment of the particular operation the unit selected by the Instruction Type field will perform. For example a sum, a shift or a compare for the Integer Unit and so on.

Register source1 and 2 fields 740, 750: these take into account the fact that certain types of operation generally need one or more operands as inputs. In addition to instructions, three bits may carry the value inside for encoding, the operands are loaded from the General Purpose Register File: the Register source1 and source2 fields are reserved for the storage of the number of the registers where the value of the operand has to be loaded.

Register destination field 760: this field indicates the register where the result of the operation has to be stored.

Reserved field 770: certain bits of the opcodes are generally reserved for special information. In this particular case the vect_switch 780 bit may be one of these reserved bits.

When the mechanism of the replication of the Vectorial instruction is switched on, if no Source/Destination Re-computation Unit were to exist, the same input operands and, consequently, the same outputs operands would be loaded into and stored by each instruction performed on each lane. This would render the basic concept of a Vectorial machine useless. Only performing the same instruction onto a great deal of data, these being different data, would implement a data parallelism concept and increase the core data processing capability.

For this reason the embodiment illustrated may include a Source/Destination Re-computation Unit, including a series of increment units that increase the numbers stored into the Register source1, source2 and destination fields.

By way of example, if a machine has four lanes and a Vectorial Instruction to be propagated over the lanes, with R10 and R20 as sources and R40 as destination. The Increment units may increase the number of the registers as follows:

Lane0: source1=R10, source2=R20, destination=R40.
Lane1: source1=R11, source2=R21, destination=R41.
Lane2: source1=R12, source2=R22, destination=R42.
Lane3: source1=R13, source2=R23, destination=R43.

The way the increment units increase the register local addresses may be selected among various techniques known to one skilled in the relevant art: local adders, shifters etc., according to the compiler's register allocation strategy. This may result in a different sequence of increasing for each source/destination register, preserving the same goal of processing (ideally) each cycle P more data than the original VLIW should do, without changing the basic core organization.

Figure 8:
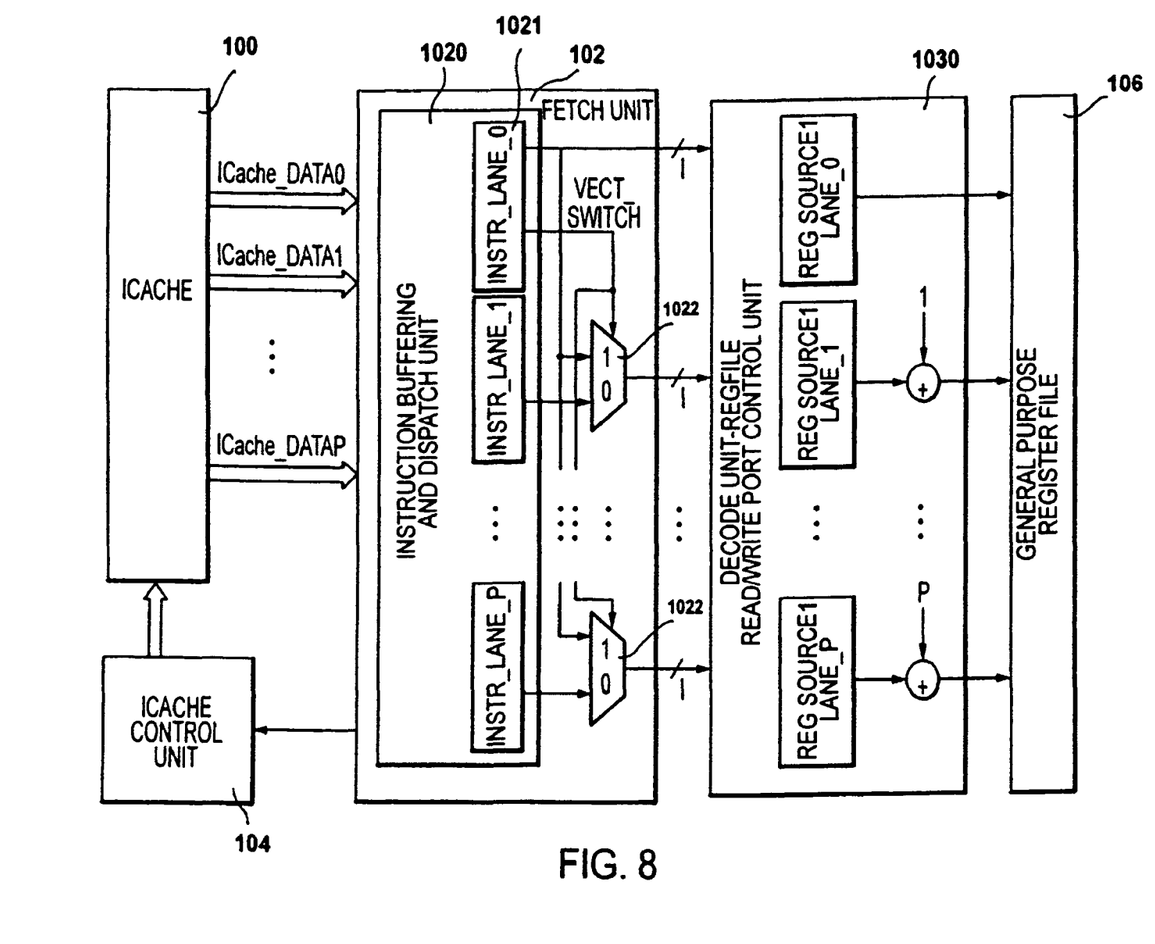

A Source/Destination Re-computation Unit arrangement as shown in FIG. 8 is another feature of this embodiment (along with the multiplexer system 1022 in the Fetch Unit of FIG. 5).

Such a unit may be notionally arranged in the Fetch Unit 102 just before (i.e. upstream) the output multiplexer system 1020. This will recognize an instruction addressing mode (i.e.: register-register, with immediate etc.) and the type of the operation.

FIG. 8 illustrates an embodiment where a Decode Unit—Regfile Read/Write Port Control Unit 1030 is arranged between the Fetch Unit 102 and the General Purpose Register File 106. It is in fact possible to locate the re-computation into this phase (without modifying the pipeline synchronization).

FIG. 8 exemplifies this basic concept only for the re-computation of register source1, but the mechanism may be applied to register source2 and register destination. FIG. 8 exemplifies a parallel computation of the right register source 1 but, as indicated above, various practical embodiments are possible.

A main advantage of the arrangement described herein lies in the possibility of supporting a dynamical switch between a VLIW core and a Vectorial machine without substantially changing the logic organization (e.g. how the instructions are fetched from the Instruction Cache 100), the pipeline organization (e.g. how the data memory subsystems interface), and all those features already present in the original VLIW core.

The arrangement described herein reduces the code size of the algorithm translation through the compiler. This reduction is quite evident at the instruction fetch phase thanks to the possibility of propagating the Vectorial instruction over all the lanes. The same data processing bandwidth of a conventional Vectorial machine can be attained by using the same resources of the original VLIW core, without adding a Vectorial dedicated Register File and computational unit.

Along with the reduction in code size, the arrangement described herein increases bundles' efficiency in terms of instruction per bundle rate. This further object is reached thanks to the instruction propagation mechanism that causes the relative bundle always full (if the Processing Elements all have the same resources). A solution for increasing data parallelism is useful for developing a parameter typical of the VLIW architecture.

A low power feature is related to a drastic reduction in traffic with the Instruction Cache, but also into the possibility to switch off those hardware resources that the Vectorial instruction will not use: a simple block gating should be drive at the instruction level point of view or thanks to the vect_switch bit.

For instance, the vect_switch bit may disable these Processing Elements where the propagation mechanism does not operate.

Scalability is made evident by the schematic representations in the Figures reported: the arrangement described herein may be extended to all VLIW machine, irrespective of the number of lanes and/or the degree of instruction parallelism. Thus the arrangement described herein makes it possible to introduce this mechanism into every VLIW machine, irrespective of the specific core arrangement.

Another important advantage lies in the limited growth in terms of area, which is related primarily to the presence of a double set of P multiplexers and the increment systems. This growth is in fact minimal in comparison with the area occupied by the whole logic circuitry of a microprocessor core.

Since most compiler techniques developed for VLIW are equally applicable to super scalar processors, arrangement described herein may be extended to a superscalar core.

A significant advantage may be achieved by using even just the multiplexer system, without the re-computation unit. If a vectorial instruction is replicated over the lanes without re-computing the source and destination registers, the machine will perform the same instruction on the same data: this mode of operation (which per se may seem redundant) may be highly requested in the case of application requiring high computing reliability: the data output from various Processing Elements may in fact be compared and cross-checked to increase computing certainty.

Prospected fields of application are all those applications (e.g. multimedia applications such as image processing and streaming video) where VLIW cores, even if so powerful as processing elements, are not so helpful due to unavailability of data parallelism. Another possible field of application is security computing applications.

The arrangement disclosed herein lends itself to being implemented as an evolution of the family of processors included in the ST200 Architecture line as currently available in the production of the Assignee company, the ST231 being a specific case in point. The STMicroelectronics® ST231 processor is a VLIW machine with four lanes and a typical core logic, wherein the Fetch Unit may be improved to include a multiplexer system and the bundle recycle arrangement as disclosed herein without changing the Instruction Cache control unit and instruction fetching speed-up.

Encoding in the ST200 family of processors leaves the possibility to have a field reserved to the vect_switch bit to be possibly considered as the main controller of Vectorial instruction propagation. At the same time the Source/Destination Register Computational Unit as described herein may be implemented easily before the general register file read/write ports.

For what concerns the Processing Elements, the ST231 has four Processing Elements but only the odd lanes have a multiplexer: the arrangement described herein thus may be implemented by ensuring that all the Processing Elements are equipped with the same hardware resources or fit the multiplexer system. In either case the area increase is very minor in view of the number of gates in the original circuit.

An interesting feature the arrangement described herein Key point of the proposed architecture is the capability of exploiting instruction and/or data parallelism switching between them dynamically: this causes a drastic decreasing of code size, an efficient use of the computational units, an easy power control and, at the same time, the possibility to have a reconfigurable core scaling the processing element number. The smart runtime reconfigurability feature is supported at a reduced cost in terms of area increase due to the double set of P multiplexers and the solution for the increment systems. Only the multiplexers system may needs to be implemented in those cores requiring computational redundancy for secure systems.

Of course, without prejudice to the principle of the invention, the details of implementation and the embodiments may vary widely with respect to what is described and illustrated herein, without thereby departing from the scope of the present invention as defined by the annexed claims.

We claim:

1. A processor architecture comprising:
   a systolic matrix including a plurality of rows and a plurality of columns, wherein each of the plurality of columns includes a Very Long Instruction Word (VLIW) computational part providing control signals and instruction flow management, and a plurality of processing elements as a vertical structure, the plurality of rows being formed by replicating the plurality of processing elements associated with each of the plurality of columns in a horizontal direction according to either a vectorial type or a multiple scalar instruction type operation approach, wherein each processing element includes a number of associated arithmetic-logic units including configuration according to a Simple Instruction Multiple Data (SIMD) paradigm that receives the same input signals;

a first set of multiplexers selects either a vectorial instruction propagation or a scalar instruction to be packed into a current cycle, and a second set of multiplexers recycles the scalar instructions; and a power-management unit to power a selective number of said processing elements and to selectively control power consumed by each processing element in said matrix and wherein said power-management unit is to scale relative frequency of operation of each processing element so as to render uniform processing time of each of the plurality of columns and balance computational burden on powered processing elements;

wherein the VLIW computational part comprises a configuration of Reduced Instruction Set Computer (RISC) type processor by setting instruction parallelism to one.

2. The architecture according to claim 1, wherein said computational part comprises a Reduced Instruction Set Computer (RISC), SIMD, or VLIW type processor with SIMD instructions.

3. The architecture according to claim 1, wherein said matrix comprises a vertical structure that is replicated a plurality of times in a horizontal direction according to a vector approach as a result of a coordinated variation in the selectively variable number of associated arithmetic-logic units in said plurality of columns of said matrix.

4. The architecture according to claim 1, wherein the rows of said matrix are configurable as systolic arrays, in which each processing element, driven by the computational part executes a respective algorithm on said input data.

5. The architecture according to claim 1, further comprising a plurality of buffers for synchronous communication between said processing elements via a simple handshake logic.

6. The architecture according to claim 5, wherein said synchronous communication comprises handshake logic.

7. The architecture according to claim 1, wherein said power-management unit is to vary supply voltage proportionally to said frequency scaling operation of said processing elements to reduce power consumption.

8. The architecture according to claim 1, wherein said power-management unit is to selectively varying processing times of said processing elements.

9. A systolic processor architecture for dynamically switching between instruction and data parallelism, the architecture comprising:

an instruction-side memory subsystem embodying very long instruction word ("VLIW") parallelism, wherein the instruction-side memory subsystem includes an instruction cache, a fetch unit and a instruction cache control unit;

a decode read/write port control unit communicatively coupled to the instruction-side memory subsystem;

a vectorial data processing array including a plurality of processing elements to support vectorial data processing communicatively coupled to the decode read/write port control unit wherein each processing element includes a number of associated arithmetic-logic units and a write/read register for communication between systolic elements;

a data-side memory subsystem communicatively coupled to the vectorial data processing array; and a power-management unit to power a selective number of said processing elements and to selectively control power consumed by each processing element in said array and wherein said power-management unit is to scale relative frequency of operation of each processing element so as to render uniform processing time within the array and balance computational burden on powered processing elements;

wherein the fetch unit fetches one or more instructions for the instruction cache and is to associate with each instruction a vector switch including a vector switch bit and wherein said vector switch bit propagates the one or more instruction to one or more of the plurality of processing elements for facilitating vectorial data processing;

wherein the vector switch further dynamically switches between VLIW parallelism and the vectorial data processing independent of fetching the one or more instruction from the instruction cache.

10. The processor architecture of claim 9 wherein the fetch unit includes an instruction buffering and dispatch unit to organize and dispatch instructions.

11. The processor architecture of claim 9 wherein the vectorial data processing array includes a general purpose register, a bypass control unit and a load store unit.

* * * * *